(12) United States Patent
Iyer

(10) Patent No.: US 6,909,890 B2
(45) Date of Patent: Jun. 21, 2005

(54) AUTOMATED SCRIPT GENERATION TO UPDATE DATABASES

(75) Inventor: Gopal N. Iyer, Boca Raton, FL (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 678 days.

(21) Appl. No.: 09/916,538

(22) Filed: Jul. 27, 2001

(65) Prior Publication Data

US 2003/0027561 A1 Feb. 6, 2003

(51) Int. Cl.$^7$ ................................................ H04M 3/00
(52) U.S. Cl. ...................... 455/418; 455/456; 455/411; 455/421; 455/419; 455/420; 455/414.2; 455/414.3; 455/406; 340/810
(58) Field of Search ................................ 455/418, 456, 455/411, 421, 419, 420, 414.2, 414.3, 406; 345/810

(56) References Cited

U.S. PATENT DOCUMENTS 6,463,289 B1 * 10/2002 Havinis et al. .......... 455/456.4
6,658,646 B1    12/2003 Hernandez, III ............ 717/115

* cited by examiner

Primary Examiner—David Hudspeth
Assistant Examiner—David Q Nguyen
(74) Attorney, Agent, or Firm—Merchant & Gould

(57) ABSTRACT

An automated script generation method to update databases in a cellular system is disclosed. Using an update application program, a user inputs a field of a cellular site information database that is to be modified. An update skeleton script is generated including all of the line commands necessary to update the field. The skeleton script is a file containing line commands to be executed. The skeleton script does not include device values or field values. An input file is generated by the user including the device that is to be changed and what the value of the identified field is to be changed to. The skeleton script is populated with the data from the input file to create a finalized script. The finalized script is run by a command handler application program to update the database.

12 Claims, 4 Drawing Sheets

AUTOMATED SCRIPT GENERATION TO UPDATE DATABASES

TECHNICAL FIELD

This invention generally relates to cellular communications. More particularly, the present invention relates to generating a script to update cell site information in a database.

BACKGROUND OF THE INVENTION

With the increasing popularity of cellular phone communications, managing the data associated with calls to and from cellular phones has become increasingly complex. For example, some of this data is cell face transfer data. Cellular phone systems typically include a cell face (or antenna) mounted on an antenna tower receiving calls from cell phones. Typically, a cell face receives calls within an associated geographic coverage area called a cell. An antenna tower can have multiple cell faces oriented at different angles to handle calls originating from multiple directions around the antenna tower. A process is employed in order to choose a cell face that handles the call from each cell phone. The process of selecting and switching among cell faces involves the use of data that designates available cell faces. A neighbor list in the database specifies all the neighbor faces to which the current call can be handed off to. Before handing a call to a neighbor cell face, signal strength from all the neighbor faces are measured and the cell face with the strongest signal strength is designated for handoff. For example, as a mobile call moves away from one cell face, the neighbor list is accessed to select another cell face that is closer to the call so that the call can be handed off to the closer cell face.

The neighbor list data and numerous other types of data (such as data pertaining to cells, Channel Data, Trunk Group and Member data, Device data, etc.) may be stored in a database of a cellular network, such as one manufactured by Ericsson. Making changes to data in one of these databases in the cellular network may be complex. For example, typically an operating system in the cellular network is used to access a command handler application. The command handler application accepts line commands and performs updates and revisions to the database based on these line commands.

One problem with these line commands is that they are not intuitive to a user. Thus, a user must be familiar with specific line commands in order to enter the correct line commands and make the proper updates and revisions. When a lot of updates need to be made to the database, manually using line commands is time-consuming and also error prone because the risk of a mistake increases. Thus, there is a need for automating the update process of these databases to decrease the amount of time required to perform database updates and also decrease the number of errors made in updating these databases.

SUMMARY OF THE INVENTION

Cellular site information is often stored in databases, such as a database manufactured by Ericsson. Updating this cellular site information is often difficult because specific line commands, or scripts, must be entered into a command handler application. Thus, one problem with updating cellular site information is that a specific knowledge of these line commands is necessary to make changes to the cellular site information databases. Another problem is that even if a user has knowledge of the required line commands, the user, when making multiple changes to the database, may make mistakes. Thus, the present invention, in one embodiment, automates the script generation process to eliminate the need for knowledge of specific line commands and to reduce the number of errors made.

In one embodiment, the invention is an automated script generation method to update databases in a cellular system. Using an update application program, a user inputs a field of a cellular site information database that is to be modified. An update skeleton script is generated including all of the line commands necessary to update the field. The skeleton script is a file containing line commands to be executed. The skeleton script does not include device values or field values. The device values and field values are input by the user. An input file is generated by the user including the device that is to be changed and what the value of the identified field is to be changed to. The skeleton script is populated with the data from the input file to create a finalized script. The finalized script is run by a command handler application program to update the database.

These and other features, advantages, and aspects of the present invention may be more clearly understood and appreciated from a review of the following detailed description of the disclosed embodiments and by reference to the appended drawings and claims.

DETAILED DESCRIPTION

Figure 1:
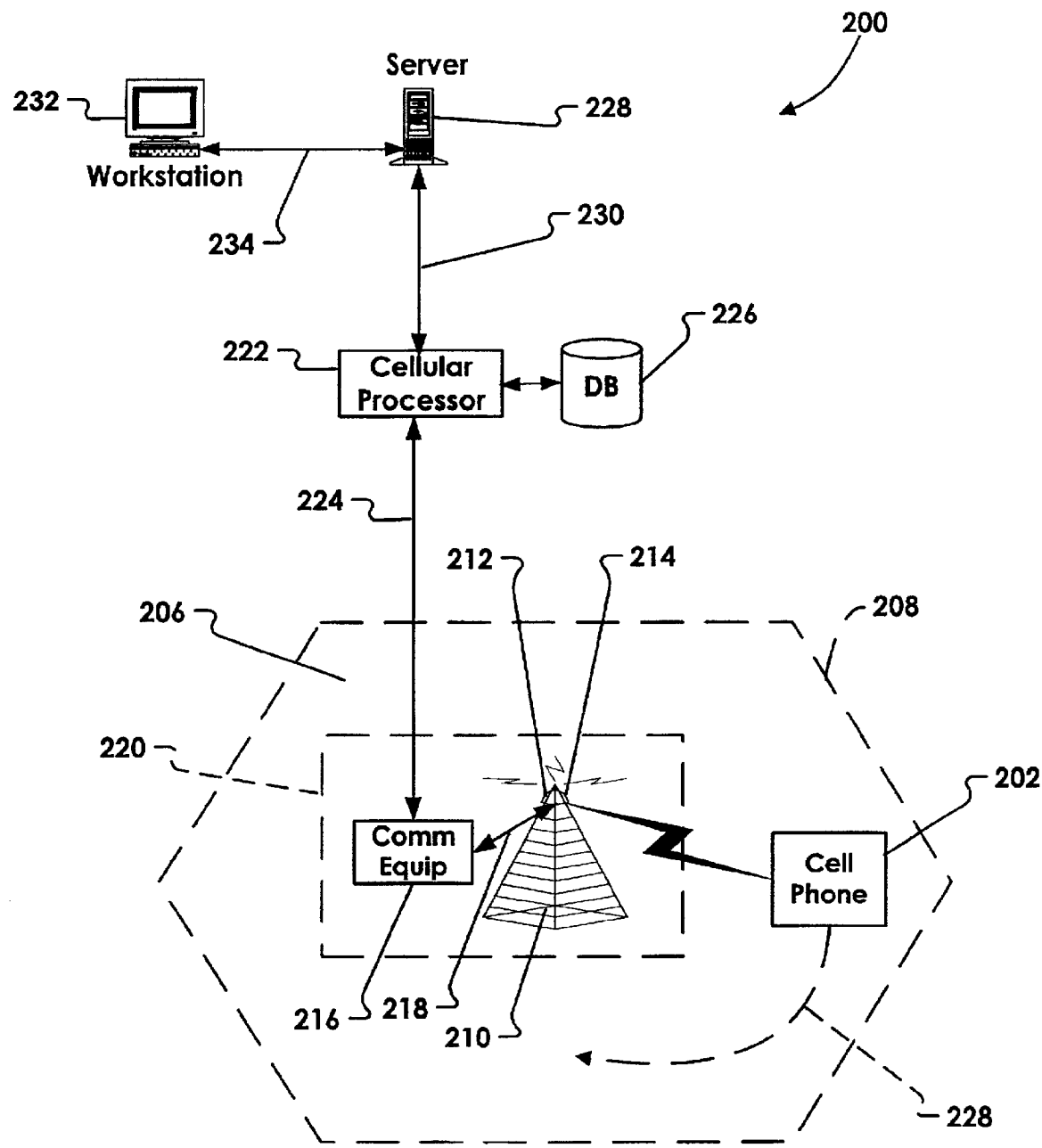
FIG. 1 is an exemplary cellular operating environment implementing an embodiment of the present invention.

In one embodiment, the present invention is an automated script generation method to update databases in a cellular system. Using an update application program, a user inputs a field of a cellular site information database that is to be modified. An update skeleton script is generated including all of the line commands necessary to update the field. The skeleton script is a file containing line commands to be executed. The skeleton script does not include device values or field values. The device values and field values are input by the user. An input file is generated by the user including the device that is to be changed and what the value of the identified field is to be changed to. The skeleton script is populated with the data from the input file to create a finalized script. The finalized script is run by a command handler application program to update the database.

Having briefly described an embodiment of the present invention, an exemplary operating environment for the present invention is described below in reference to FIG. 1. Referring now to the drawings, in which like numerals represent like elements throughout the several figures, aspects of the present invention will be described.

FIG. 1 illustrates a suitable operating environment 200 utilizing an embodiment of the present invention. The environment 200 is generally a cellular telephone system for receiving and transmitting cellular phone calls. A cellular phone 202 is transmitting a signal 204 within a cell 206. The cell 206 is a geographic area generally defined by a boundary 208. The cell includes an antenna tower 210 that has transmitters and receivers for transmitting and receiving signals. The transmitters on the antenna tower 210 transmit at a designated power level. Likewise, the cell phone 202 transmits the signal 204 at a designated power level. The designated power levels of the antenna tower transmitters and the cell phone 202 dictate the location of the boundary 208 of the cell 206. Receivers on the antenna tower 210 will generally receive the signal 204 while the cell phone 202 is within the boundary 208 of the cell 206. Generally, when the cell phone 202 leaves the boundary 208 of the cell 206, the receiver of the antenna 210 will no longer receive the signal 204. In one embodiment, the cell boundary 208 is substantially hexagonal in shape.

A receiver on the antenna tower 210 is generally referred to as a cell face. The antenna tower 210 may have more than one cell face, such as a cell face 212 and cell face 214. A typical antenna tower has three cell faces, but the number of cell faces can vary. Each cell face on the antenna tower 210 is positioned so that it covers an area within the cell 206. Depending on the positioning and the orientation of the cell face 214, the cell face 214 will receive calls coming from a particular direction. The cell face 212 is oriented in a different position to receive calls coming from a different direction with respect to the antenna tower 210. A variety of cell face configurations are known in the art. For example, one cell face configuration is known as the omni face, which comprises a single cell face with a coverage area of 360° around the antenna tower. A common cell face configuration includes three cell faces with each cell face having a coverage area of 120° around the antenna tower. Typically a structure 216 is located near the antenna tower that houses communications equipment, such as radio transmitters, radio receivers, and power supplies. The communications equipment is connected to transmitters and cell faces on the antenna tower via a communications link 218. The structure 216 and the antenna tower 210 are commonly referred to as a base station 220. The base station 220 is located substantially in the middle of the cell 206.

Each cell face on the antenna tower 210 has an associated transmitter. Transmitters transmit control signals on unique control channels or frequencies that are used to send control messages to the cell phone 202. When the cell phone 202 is in operation, the cell phone 202 searches for the strongest control signal coming from the antenna tower 210. The receiver in the cell phone 202 locks on to the strongest control channel and begins receiving control information. The control information includes the transmission frequency at which the cell phone 202 should transmit. In the exemplary environment 200, when the cell phone 202 begins operation, it receives the strongest control signal from a transmitter associated with the cell face 214. Thus, as depicted in FIG. 1, the signal 204 from the cell phone 202 is being received by the cell face 214. The cell phone 202 may transmit using any of a number of communications protocols known in the art. The signal 204 will follow the protocol used by the cell phone 202. For example, the cell phone 202 may utilize an analog protocol known as advanced mobile phone system (AMPS). Alternatively, the cell phone 202 may use a digital protocol, such as time division multiple access (TDMA).

The communications equipment 216 receives the signal 204 and may demodulate the signal. The communications equipment 216 typically is operable to receive signals in a variety of formats, including AMPS and TDMA. The signal 204 is sent to a cellular processor 222 via a communications link 224. The cellular processor 222 is typically a sophisticated computing device operable to manage cellular communications at the antenna tower 210. For example, the cellular processor 222 can monitor the signal strength of the signal 204. Also, the cellular processor 222 can detect when the cell phone 202 has been disconnected to terminate the call 204. The cellular processor 222 may also facilitate billing and locating the cell phone 202. One example of a cellular processor known in the art is the Executive Cellular Processor (ECP) manufactured by Lucent. Many other cellular processors are known in the art. The cellular processor 222 utilizes a database 226 to perform its functions. One particular function that the cellular processor 222 performs is determining which of the cell faces on the antenna tower 210 should optimally be used to receive the signal 204.

When the cell phone initially places a call 204, the cell phone 204 may be located in the coverage area of the cell face 214. Thus, the cell face 214 may have been optimal at the beginning of the conversation. However, the user of the cell phone 202 may be moving while the conversation is taking place. While the cell phone 202 moves in a direction 228, the signal strength of the signal 204 will vary with respect to the cell faces 212 and 214. The cellular processor 222 detects the variation in signal strength of the signal 204. As the cell phone 202 moves in the direction 228, it moves away from the cell face 214 and closer to the cell face 212. The cellular processor 222 detects a decrease in the signal power received by the cell face 214. Eventually, as the cell phone 202 continues to move, signal power received by the cell face 214 will be less than a minimum required level. In response, the cellular processor 222 accesses the database (neighbor or handoff list) 226 to determine which cell face the signal 204 can be transferred to.

The cellular processor 222 accesses a neighbor list in the database 226. The neighbor list is generally a list of cell faces to which a signal may be transferred or handed off. For example, the database 226 has a neighbor list associated with the cell face 214. The neighbor list for cell face 214 provides a list of available cell faces where the signal 204 can be transferred. In the example shown in FIG. 1, the cell face 212 is among the available cell faces given in the cell face transfer data for the cell face 214. After the cellular processor 222 identifies the cell face 212 as the optimal cell face, the cellular processor 222 sends a message to the communications equipment 216 indicating that the cell phone 202 should begin transmitting at a frequency associated with the cell face 212. In response to a message from the cellular processor 222, the transmitter for the cell face 214 transmits a control signal to the cell phone 202 that instructs the cell phone to switch to a frequency associated with the cell face 212. The process of transferring the cell phone signal 204 from the cell face 214 to the cell face 212 is extremely fast. There is no break in the conversation recognizable by the user of the cell phone 202. The process of transferring a signal from one cell face to another is referred to as handing off the Call.

In order to update database 226, an embodiment of the present invention is running on a server 228 that is in communication with the cellular processor via a communication link 230. The server preferably includes an update system that is accessible by a workstation 232 connected to the server via a communication link 234. A user of the workstation 232 can access the update system running in the server 228 to facilitate updating of the database forms. Cellular processor 222 transfers the forms from the database 226 to the server 228 via the communication link 230. The update system accesses the forms in the server 228. The forms may include Neighbor list. However, the forms may also include other types of cell site information data such as cell information, channel information, device information, trunk group and member information, etc. The description of neighbor list is exemplary and is not meant to limit the type of cell site information that may be stored in the database.

Figure 2:
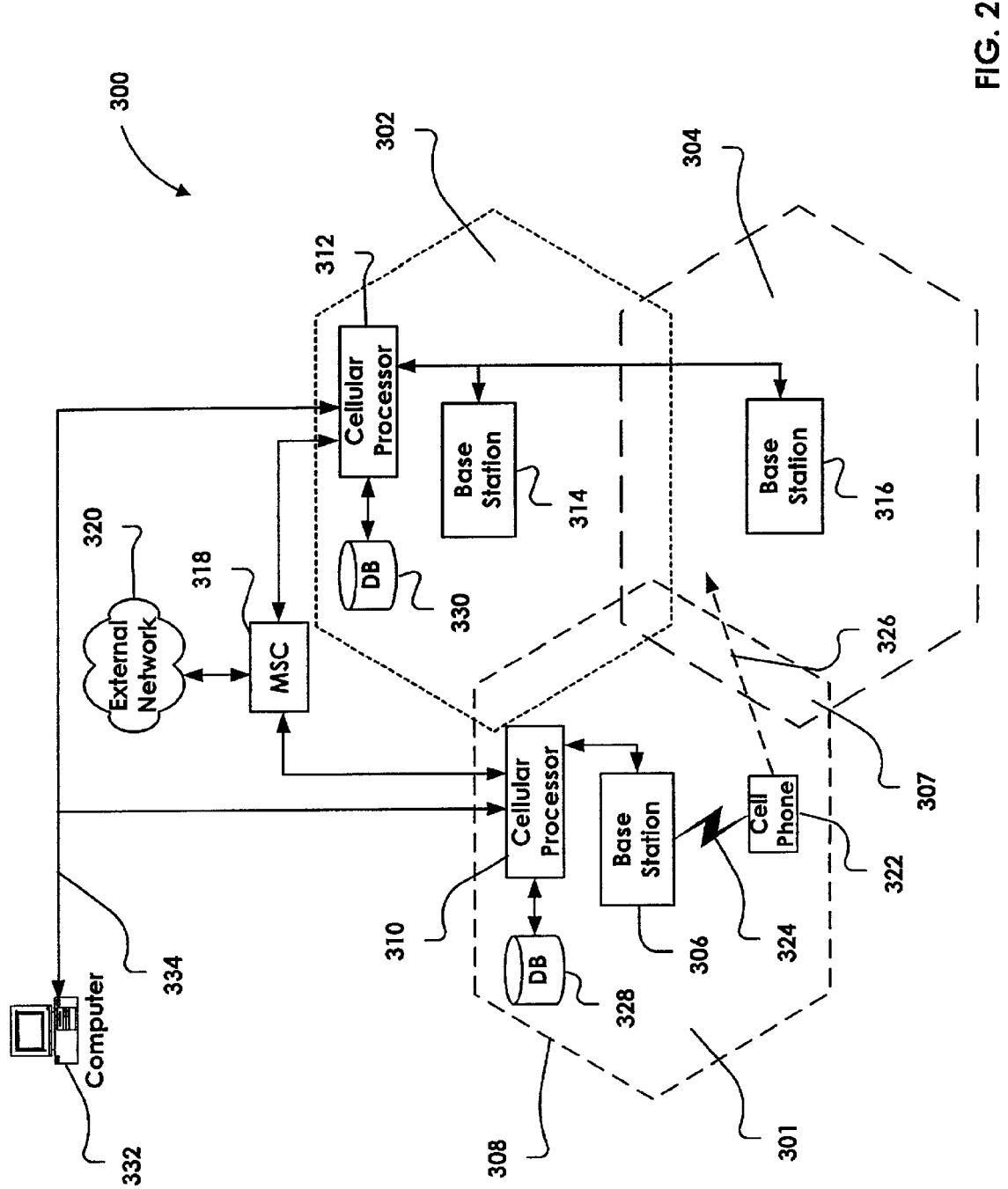
FIG. 2 is a multiple cell operating environment implementing an embodiment of the present invention.

FIG. 2 illustrates an exemplary multiple cell operating environment 300 implementing an embodiment of the present invention. The environment can include one or more cells, such as cell 301, cell 302, cell 304. Cells are often referred to as sites. Typically, each cell has an associated cell identification number used to identify the cell. Each cell has a base station, such as base station 306. The cell 302 has a base station 314 and cell 304 has a base station 316. Like the base station 220 of FIG. 1, the base stations 306, 314, and 316 each include radio equipment and an antenna tower having one or more cell faces. Cells 301, 302 and 304 may, but do not necessarily, overlap, as shown by an overlapping region 307. In one embodiment, the cell 301 has a coverage area defined by a substantially hexagonal boundary 308. During operation, a cellular processor 310 communicates with the base station 306 to monitor calls within the cell 301. Another cellular processor 312 communicates with the base station 314 and the base station 316 to monitor calls within cell 302 and cell 304 respectively. A typical cellular processor may be associated with 100 or more cells and base stations. The environment illustrated in FIG. 2 is exemplary only and the systems and methods described can generally be applied to environments including hundreds of cells.

As has been discussed, cellular processors, such as cellular processor 310 and cellular processor 312 typically monitor various data about cellular phone calls, such as signal strength, cell phone location, and billing. The cellular processors 310 and 312 also transmit signals to a mobile switching center (MSC) 318. The MSC 318 relays cell phone signals to an external network 320, such as a telephone wireline network. The MSC 318 is a sophisticated system that is in communication with networks and switches around the world to determine an optimal route for cell phone calls to reach their destination.

In the exemplary environment 300, a mobile communication device, such as a cell phone 322, is shown in the cell 301 transmitting a signal 324 to the base station 306. The signal 324 transmits voice data over a voice channel to a cell face at the base station 306. The base station 306 receives the signal 324 and transmits it to the cellular processor 310 so that the cellular processor 310 can monitor the signal 324. The cellular processor 310 may also transmit the signal 324 to the MSC 318, which may route the signal to the external network 320. The cell phone 322 may utilize any communications technology known in the art and the signal 324 may follow any protocol known in the art. Communications technologies include, but are not limited to, Code Division Multiple Access (CDMA), Advanced Mobile Phone System (AMPS), Global System for Mobile Communications (GSM), and Time Division Multiple Access (TDMA). Preferably, the base station 306 is operable to receive any or all of the possible communications technologies. The base station must be configured to each technology—the Radios must be analog or digital. An analog radio won't be able to handle digital calls. If the radio is a TDMA radio, it won't be able to handle GSM or CDMA calls.

As shown in FIG. 2, the cell phone 322 is traveling in a direction 326. The cell phone 322 is moving in the cell 301 toward the cell 304. As the cell phone 322 travels, it maintains communications with the base station 306 and the cellular processor 310 monitors the strength of the signal 324. As the cell phone 322 moves farther from the base station 306, the cellular processor 310 may detect that the strength of the signal 324 diminishes or weakens. The cell phone 307 travels through the overlapping region 307 where cell 304 and cell 301 overlap. When the signal strength of the signal 324 drops below a minimum power level, the cellular processor 310 accesses a neighbor list in a database 328 to determine an available cell face for a hand off. The database 328 contains a plurality of neighbor lists. Each neighbor list is associated with a cell face at a cell. Preferably each neighbor list has a cell identifier and a cell face identifier for the associated cell face. The cellular processor 310 reads cell face transfer data entries from the neighbor list that identify an available transfer cell face for a hand off. Handing off a call generally means transferring the call from one cell face to another cell face.

Cell face transfer data may be updated when a new cell such as cell 304 is implemented. For example, cell 304 and its associated base station 316 may be put into service after the cells 301 and 302 are operating. When the base station 316 is put into service, a plurality of new cell faces associated with base station 316 are made available to offer mobile communication service that was not existent prior to implementation of cell 304. As a result of the implementation of cell 304, data in the databases 328 and 330 may be updated to reflect the addition of cell 304. As an example, a call in cell 301 traveling into cell 304 may be handed off to a cell face of the base station 316. The cellular processor 312 will monitor the mobile telephone user's call for various parameters including signal strength. As the traveler travels from the cell 301 toward the cell 304, the signal strength from the call may diminish. The cellular processor 312 will send a signal to the base station 306 to initiate a hand-off to transfer the call to a cell face of the base station 316. The cellular processor 310 accesses the cell face transfer data stored in the database 328. The cellular processor 310 uses cell face transfer data in the database 328 to identify cell faces that are available for the call 324 to be handed-off.

Also shown in FIG. 2 is a computer 332 communicating with the cellular processor 310 and the cellular processor 312. The computer 332 implements an update system in accordance with an embodiment of the present invention. The update system can automatically update the database 328 and the database 330. The communications channel 334 can be any communications means known in the art. Examples of communications channels include, but are not limited to, Ethernet, telephone lines, or any proprietary communications protocol. A user of the computer 332 can select between the database 328 and the database 330, and access the database to update forms on the database. It should be understood that, in some embodiments, the databases 328, 330 may be located at the MSC 318. It should also be understood that the databases 328, 330 may include all different types of cell site information, not just cell face transfer data.

Figure 3:
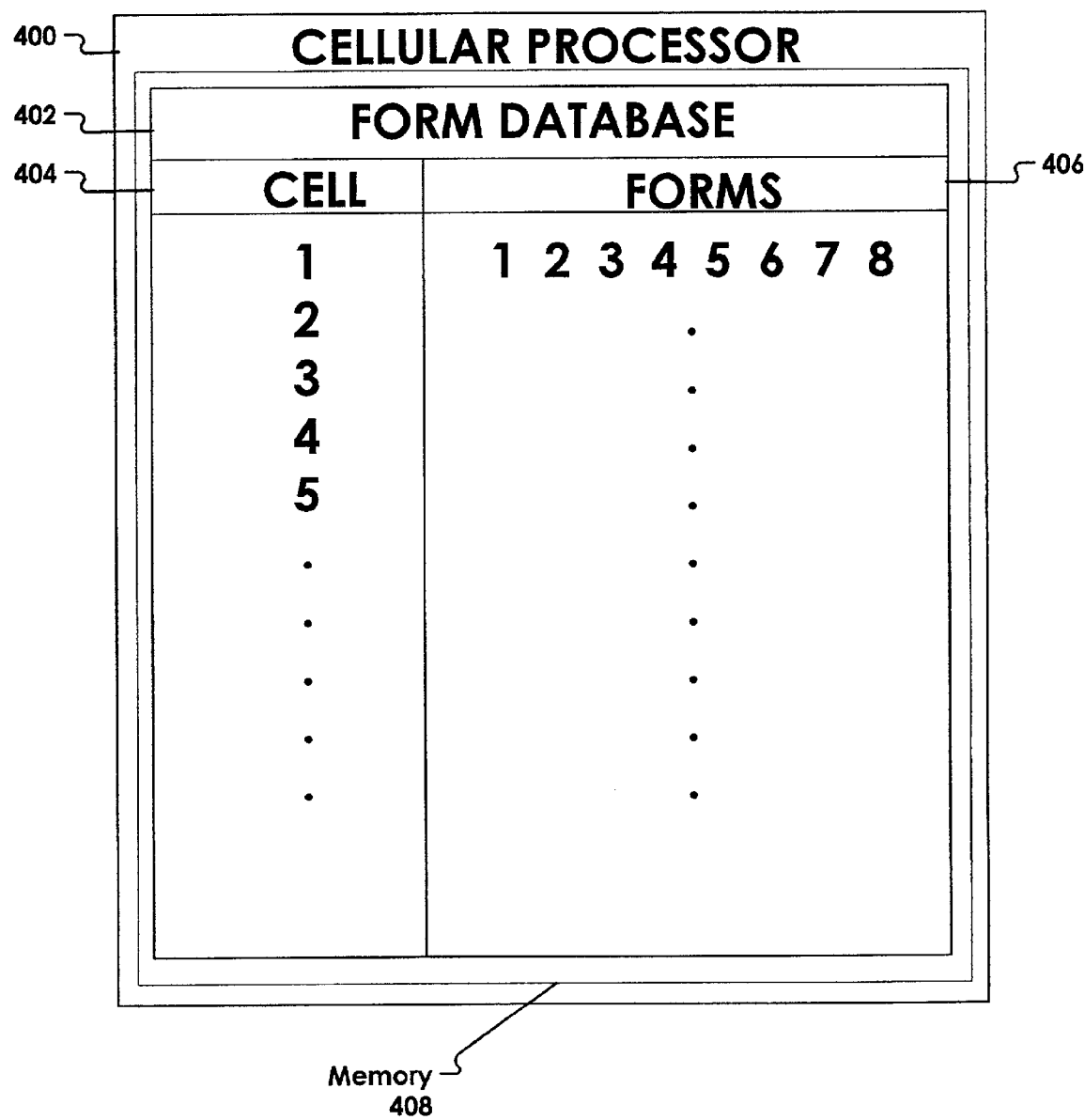
FIG. 3 is a diagram illustrating a cellular processor including a forms database.

FIG. 3 illustrates an exemplary cellular processor including a forms database including cell face transfer data and other types of data. A cellular processor 400 is depicted having memory 408 wherein database data is be stored. Memory 408 can be any form of storage media known in the art, including, but not limited to random access memory (RAM), read only memory (ROM), electronically erasable programmable read only memory (EEPROM), or flash memory. Also, the form data base 402 can be stored on mass storage devices such as, but not limited to, CD ROM, digital versatile discs (DVD), magnetic cassettes, PCMCIA card memory, or any other medium which can be used to store the desired information and which can be accessed by the cellular processor 400. In general, the form database 402 is a table of binary encoded data that is indexable by cell identification numbers 404. Each cell identification number 404 can identify a physical cell site. Each cell identification number 404 may also identify a cell face of a cell. For each cell identification number 404, a plurality of forms 406 exist in the form database 402. Each form holds a particular kind of data associated with a given cell identification number 404, and preferably can be viewed on a computer monitor. Example forms may include information regarding a cell such as latitude/longitude (where the cell is located), what ECP/MSC the cell belongs to, the status of the cell (equipped/unequipped), how many radios of each type the cell has, trunk groups associated with the cell, etc.

Figure 4:
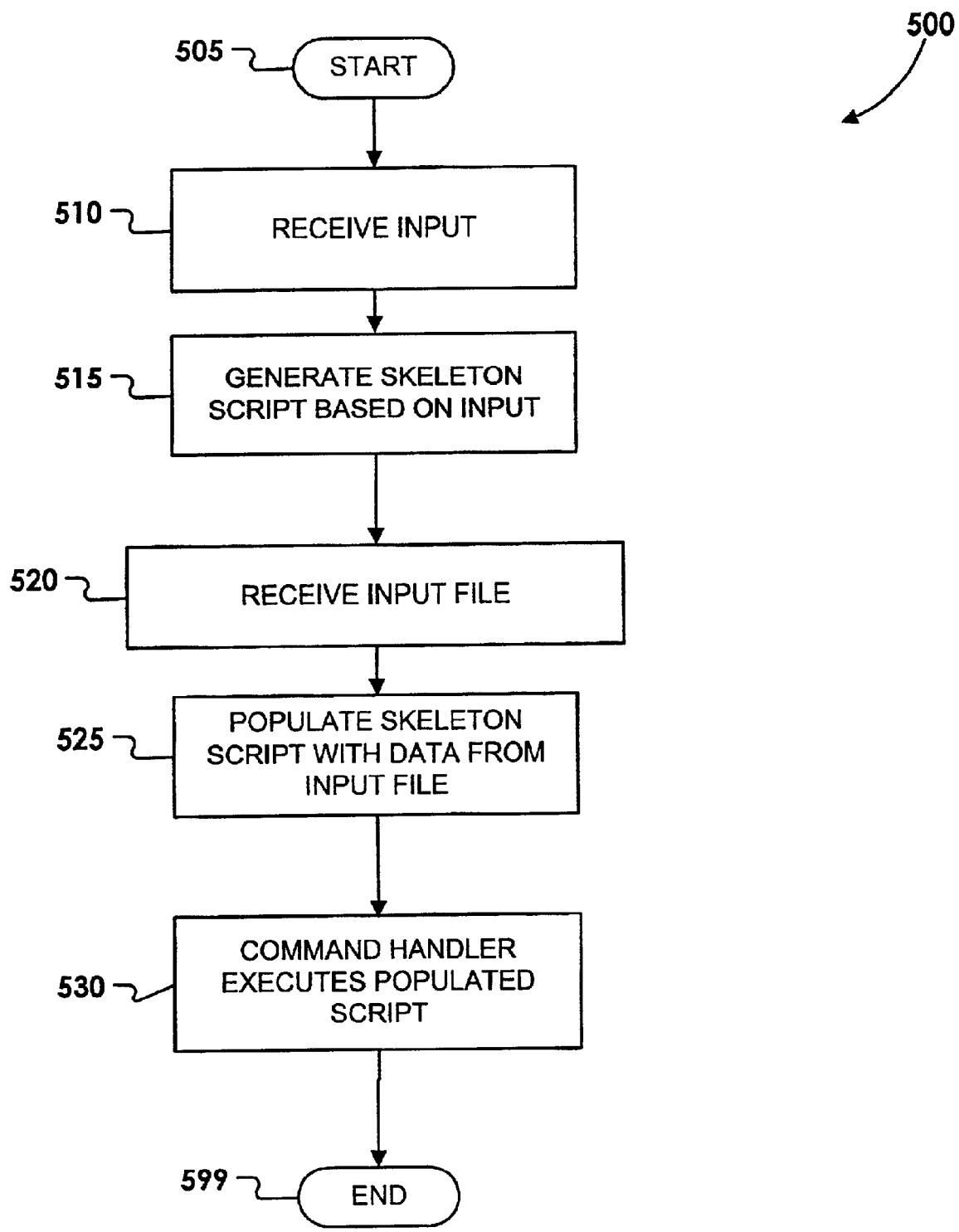
FIG. 4 is a flow diagram illustrating a method for updating a cellular site database in accordance with an embodiment of the present invention.

Referring now to FIG. 4, a flow diagram illustrating a method 500 for updating a cellular site database in accordance with an embodiment of the present invention will be described. The method 500 begins at start step 505 and proceeds to step 510 where an input is received. The input identifies a field of a database that is to be modified. For example, the user may enter "vcg" to indicate that the user wishes to modify the voice channel group (vcg) field. It should be understood that, in a preferred embodiment of the invention, the database is a cellular site information database such as 226, 328, or 330. It should also be understood that, in a preferred embodiment, the database is a cellular site information database manufactured by Ericsson. In a preferred embodiment, the present invention is an update application program that is running on server 228 and/or computer 332. It should also be understood that an operating system for the cellular site information is running on server 228 and/or computer 332. For example, the operating system may be the Ericsson Operation & Support System (OSS). In conjunction with the operating system for the cellular site information, a command handler application program may also be running on server 228 and/or computer 332. For example, the command handler may be the Ericsson command handler. A command handler is a program in which users enter line commands and have those line commands executed. A sample line command for input into the Ericsson command handler is: blodi:dev=mdvc-1001. This command when executed by the command handler will block the device "mdvc-1001" from the cellular system. Thus, in a preferred embodiment of the present invention, the user enters an input into the update application program running on the workstation 232 or computer 332 to indicate a field of the cell site information that the user wishes to modify. Another sample line command is mtclp:cell=all; this command 110 displays all the cells in the database. The field "cell" tells the system that the user is looking for the cells. Another example is mbtcp:ceq=mbceq-001 which illustrates the CEQ (Channel Equipment) to MBTPT (another device) connection. The method then proceeds to step 515.

At step 515, a skeleton script is generated including the line commands necessary to update the field identified at step 510. The skeleton script is a file containing line commands to be executed. However, the skeleton script does not include device values or field values which are input by the user as will be described below. In one embodiment of the invention, a lookup table is used to find the skeleton script based on the input received at step 510. For example, whenever the user enters the "vcg" field, then a particular skeleton script is used and whenever the user enters another field another skeleton script may be used. The method then proceeds to step 520.

At step 520, an input file is generated including the device that is to be changed and what the value of the identified field is to be changed to. For example, if the field "vcg" was identified at step 510, then at step 520, the device to be modified is identified, such as "mdvc-1001" and what the vcg field should be changed to for the device is identified, such as "vcge3".

The method 500 then proceeds to step 525. At step 525, the skeleton script generated at step 515 is populated with the data from the input file generated at step 520 to create a finalized script. The method then proceeds to step 530.

At step 530, the finalized script is run by the command handler application program to update the database. The method then ends at step 599.

An example illustrating method 500 may be described as follows. Suppose a user needs to update the vcg field for a number of cellular devices. At step 510, the user inputs the field name "vcg" into the update application program. At step 515, a skeleton script is generated to update a vcg field. For example, the update application program may generate the following skeleton script:

```
Blodi:dev=_____;
Mtcgc:dev=_____, vcg=_____;
Blode:dev=_____;
```

The Blodi and Blode commands are used to block and unblock a device. The Mtcgc command is used to identify a device for which the vcg field needs changing and the vcg command is used to change the value of the vcg field. The blanks indicate portions of the skeleton script which are populated as described below. Note that the user simply enters "vcg" into the update application program and it is able to generate the skeleton script described above.

At step 520, the user generates an input file including the device that is to be changed and what the value of the identified field is to be changed to as shown below:

```
mdvc-1001 vcge3
mdvc-2001 vcge4
..........
END
```

In this example the user wants to change the vcg field for mdvc-1001 to vcge3 and the vcg field of mdvc-2001 to vcge4 and so on. Thus, the user simply enters the device and the values that they want the field changed to for the device.

At step 525, the skeleton script generated at step 515 is populated with the data from the input file generated at step 520 to create a finalized script as illustrated below:

```
Blodi:dev=mdvc-1001;
Mtcgc:dev=mdvc-1001, vcg=vcge3;
Blode:dev=mdvc-1001;
Blodi:dev=mdvc-2001;
Mtcgc:dev=mdvc-2001, vcg=vcge4;
Blode:dev=mdvc-2001;
..........
END
```

When the finalized script is invoked from the command handler application, the commands are executed one by one and the database is updated at step 530.

Thus, it should be understood from the foregoing description that, in one embodiment, the present invention automates the update process for cellular site information databases. A user enters the field to be modified, the devices to be modified and what the field should be modified to for a particular device. The present invention, in one embodiment, may populate a skeleton script with the device identifiers and new field values and execute the populated script using a command handler. The database is then updated. The user does not need to remember or know line commands. Also, even experienced line command users avoid input errors because the line commands in the script are automatically generated for the user.

Although the present invention has been described above as implemented in a preferred embodiment, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. A computer-implemented method for updating a cellular site information database comprising cell site data, the method comprising:
   receiving a field input wherein the field input identifies a field type in the cellular site information database that is to be modified;
   generating a skeleton script by searching a lookup table to find a skeleton script associated with the field type, wherein the skeleton script comprises a plurality of line commands to modify the field type identified by the field input;
   receiving an input file comprising at least one device value and at least one filed value identifying the cell site data to be modified;
   populating the skeleton script with the at least one device value and the at least one field value to generate a script; and
   executing the script to update the cellular site information database.

2. The method of claim 1 wherein the field input is input by a user.

3. The method of claim 1 wherein the cellular site information database is an Ericsson database.

4. The method of claim 1 wherein the device value identifies the device that is to be changed and the field value identifies what the value of the field type for the device is to be changed to.

5. The method of claim 1 wherein executing the script to update the cellular site information database comprises running a command handler application program to update the cellular site information database.

6. The method of claim 5 wherein the command handler application is operated in conjunction with a cellular site operating system.

7. The method of claim 6 wherein the cell site operating system is an Ericsson Operation & Support System (OSS).

8. A computer-readable medium comprising computer-readable instructions which, when executed, are operable to perform the method of claim 1.

9. A computer-implemented method for updating a form of a cellular site information database of a cellular system, the method comprising:
   receiving a field input wherein the field input identifies a field type in the form that is to be modified;
   locating a skeleton script by searching a lookup table to find a skeleton script associated with the field type, wherein the skeleton script comprises a plurality of line commands to modify the field type identified by the field input;
   receiving an input file comprising at least one device value and at least one field value wherein the device value identifies a device and the field value identifies a value for the field type for a form associated with the device;
   populating the skeleton script with the at least one device value and the at least one field value to generate a script; and
   executing the script to update the cellular site information database.

10. The method of claim 9 wherein executing the script to update the cellular site database comprises modifying an existing value of the field type in the form to be modified to be equal to the field value.

11. The method of claim 10 wherein the form to be modified comprises a form associated with the device identified by the device value.

12. A computer-readable medium comprising computer-readable instructions which, when executed, are operable to perform the method of claim 9.

* * * * *